United States Patent
Anson

(10) Patent No.: US 7,592,998 B2
(45) Date of Patent: *Sep. 22, 2009

(54) SYSTEM AND METHOD FOR INPUTTING CHARACTERS USING A DIRECTIONAL PAD

(75) Inventor: David Leininger Adolphson Anson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 564 days.

This patent is subject to a terminal disclaimer.

(21) Appl. No.: 11/293,916

(22) Filed: Dec. 5, 2005

(65) Prior Publication Data

US 2006/0082547 A1    Apr. 20, 2006

(51) Int. Cl.
G09G 5/00    (2006.01)

(52) U.S. Cl. ............... 345/156; 345/157; 345/164; 345/168; 345/169

(58) Field of Classification Search ......... 345/156–157, 345/164, 168–169
See application file for complete search history.

(56) References Cited

U.S. PATENT DOCUMENTS

| 5,963,671 A | 10/1999 | Comerford et al. | 382/230 |
| 6,037,942 A * | 3/2000 | Millington | 715/835 |
| 6,215,906 B1 * | 4/2001 | Okada | 382/239 |
| 6,271,835 B1 | 8/2001 | Hoeksma | 345/168 |
| 6,295,052 B1 * | 9/2001 | Kato et al. | 345/179 |

FOREIGN PATENT DOCUMENTS

WO    WO 99/30222    6/1999

* cited by examiner

Primary Examiner—Richard Hjerpe
Assistant Examiner—Leonid Shapiro
(74) Attorney, Agent, or Firm—Merchant & Gould; Ryan T. Grace

(57) ABSTRACT

A system and method for enabling a user to input characters using a directional pad of a computing device. The directional pad is configured to generate directional inputs. The invention creates mappings for the directional inputs where each of the mappings associates at least one of the directional inputs with at least one of the characters. The user may activate one of the mappings by selecting one of the directional inputs. While the mapping is activated, the user may input a character by selecting a directional input associated with that character.

8 Claims, 4 Drawing Sheets

SYSTEM AND METHOD FOR INPUTTING CHARACTERS USING A DIRECTIONAL PAD

This application claims the benefit of application Ser. No. 10/300,174, filed Nov. 19, 2002, the benefit of the earlier filing date is hereby claimed under 35 U.S.C. § 120.

BACKGROUND OF THE INVENTION

Mobile computing devices are becoming increasingly popular among business users as well as causal users. Manufacturers continue to expand th capabilities of these mobile computing devices to perform many of the tasks that have traditionally been reserved only for desktop computers. Some of the newest mobile computing devices can rival the computing power and communication capacities of many of the existing desktop computers.

Although these mobile computing devices are very capable in terms of performance and versatility, they are often not as user-friendly as traditional desktop computers. One particular problem area with mobile computing devices is text input. Many applications on mobile computing devices involve text input. Because of the emphasis on mobility, these devices generally do not have a full keyboard for inputting text.

Several keyboardless inputting means are currently available for a mobile computing device. One particular means is the use of a touch screen, which integrates a touch sensitive pad with a display. Generally, a user enters text by writing or tapping on the touch screen using a stylus. A number of different methods may be used by the mobile computing device to enable the user to input text using the touch screen. For example, the mobile computing device may present a virtual keyboard on the touch screen, allowing the user to enter text by tapping on the virtual keyboard. The mobile computing device may also include handwriting recognition software so the user can virtually write the text input on the touch screen. Although the touch screen is capable, it is not very convenient for the user. In particular, the user is required to use two hands and exercise quite a bit of eye-hand coordination. The large size of the costly electronic components and the computing power required also render touch screen technology unfeasible in many applications.

Another keyboardless inputting means that is found on many existing wireless phones is multitap. Multitap uses a conventional number-key pad. Each of the numbers 2 to 9 on a number-key pad is uniquely associated with three to four letters of the alphabet. A user may enter a particular letter by pressing the number key associated with the letter. Since each number key is associated with more than one letter, the user may have to press the number key up to four times to cycle to the desired letter. Once the desired letter is found, the user has to wait until the selection is committed and the letter is inputted. The advantage of multitap is that it allows the user to enter text with one hand. However, multitap requires the user to move his fingers over eight different keys. This wide range of motion demands a great deal of attention by the user, which can be annoying and even dangerous in some situations. Also, multitap is a slow text input method because of the numerous key presses that are required and the wait state associated with each letter input.

An efficient and user-friendly means of inputting text continues to elude those skilled in the art.

SUMMARY OF THE INVENTION

Briefly stated, the present invention is a system and method for enabling a user to input characters using a directional pad of a computing device. In one aspect, the invention is directed to a computer-implemented method for enabling a user to input characters on a computing device having a directional pad configured to generate directional inputs. The method creates mappings for the directional inputs where each of the mappings associates at least one of the directional inputs with at least one of the characters. The method enables the user to activate one of the mappings by selecting one of the directional inputs. While the mapping is activated, the user may input a character by selecting a directional input associated with that character.

In another aspect, the invention is directed to a computing device having a directional pad and a computer-readable medium encoded with a character input engine. The directional pad is configured to generate directional inputs. The character engine enables a user to input characters using the directional pad. The character input engine includes a plurality of mappings for the directional inputs. Each of the mappings associates at least one of the directional inputs with at least one of the characters.

In yet another aspect, the invention is directed to a computer-readable medium encoded with a data structure. The data structure includes three data fields. The first data field contains characters. The second data field contains directional input identifiers that represent directional inputs generated by a directional pad. The third data field contains mappings for the directional inputs. Each of the mappings associates at least one of the directional input identifiers in the second data field with at least one of the characters of the first data field.

DETAILED DESCRIPTION OF THE PREFERRED EMBODIMENT

The inventors of the present invention have appreciated that enabling the user to input data using a simple input mechanism will greatly enhance the usability of a computing device. Thus, the present invention focuses on a system and method for enabling the user to efficiently input characters using a directional pad of a computing device. The manner in which the characters are input in the present invention is very different from conventional input means. For example, some conventional input means require the use of keys that are not configured in an intuitive and convenient manner. These conventional input means often require the user to exercise substantial mental concentration and a large amount of finger movements just to input characters. In contrast, the present invention provides a more intuitive and efficient approach for inputting characters and allows the user to concentrate on the content of the data without being distracted with complicated input procedures. These and other aspects of the invention will become apparent after reading the following detailed description.

Figure 1:
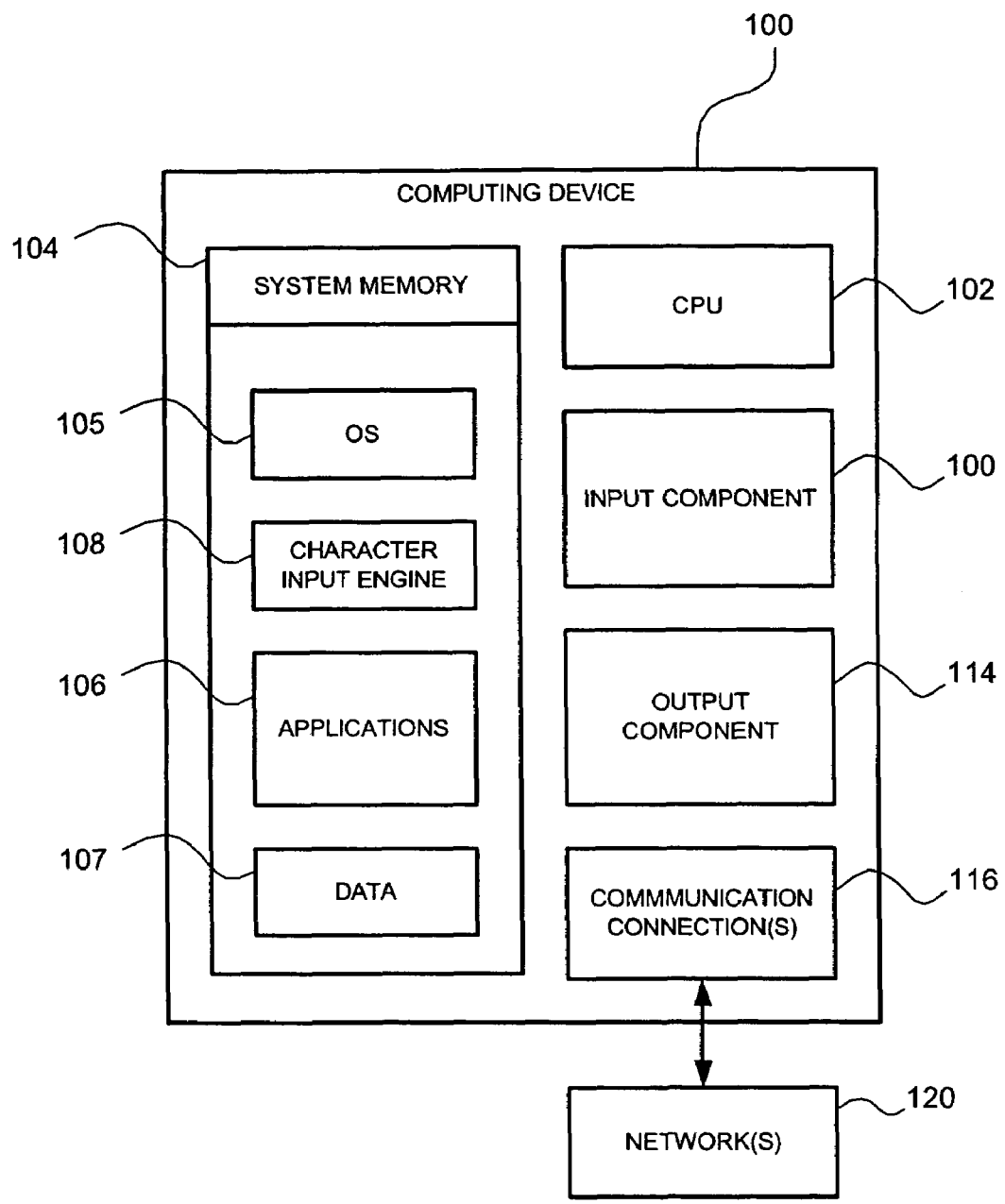
FIG. 1 illustrates an exemplary computing device that may be used in one exemplary embodiment of the present invention.

FIG. 1 illustrates an exemplary computing device that may be used in one exemplary embodiment of the present invention. With reference to FIG. 1, one exemplary system for implementing the invention includes a computing device, such as computing device 100. It is to be understood that many different kinds of computing devices may implement this invention. These computing devices include desktop computers, various mobile computers such as personal digital assistants, communication devices such as wireless phones and portable communication devices, video gaming units, and the like. For illustrative purposes, a general computing device 100 will be described. A computing device that is capable of implementing this invention may have more, less, or different components as those shown in FIG. 1.

Computing device 100 may include various hardware components. In a very basic configuration, computing device 100 typically includes a central processing unit 102 and system memory 104. Depending on the exact configuration and type of computing device, system memory 104 may include volatile memory, non-volatile memory, data storage devices, or the like. These examples of system memory 104 are all considered computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100.

Computing device 100 may also contain input component 112 for inputting characters. In particular, input component 112 may include a directional pad. Directional pad will be discussed in more detail in conjunction with FIG. 2. Briefly stated, a directional pad allows a user to intuitively select directional inputs, such as an input that indicates left, right, up, down, and center. Output component 114 may include a display, speakers, printer, and the like.

Computing device 100 may also contain communication connections 116 that allow the device to communicate with other computing devices over network 120, such as a wireless network, local area network, wide area network such as the Internet, and other communication networks. Communication connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Software components of computing device 100 are typically stored in system memory 104. System memory 104 typically includes an operating system 105, one or more applications 106, and data 107. As shown in the figure, system memory 104 may also include a character input engine 108. Character input engine 108 is a software component that handles character input for computing device 100. It may be incorporated into the operating system 105 or applications 106, or it may be a stand-alone component. Character input engine 108 is configured to enable a user to input characters using a directional pad and to provide the input characters to applications 106. Character input engine 108 may display an input guide on a display for guiding the user to input the characters. Applications 106 or the user may configure character input engine 108 to input a particular character based on a specific sequence of directional inputs.

Figure 2:
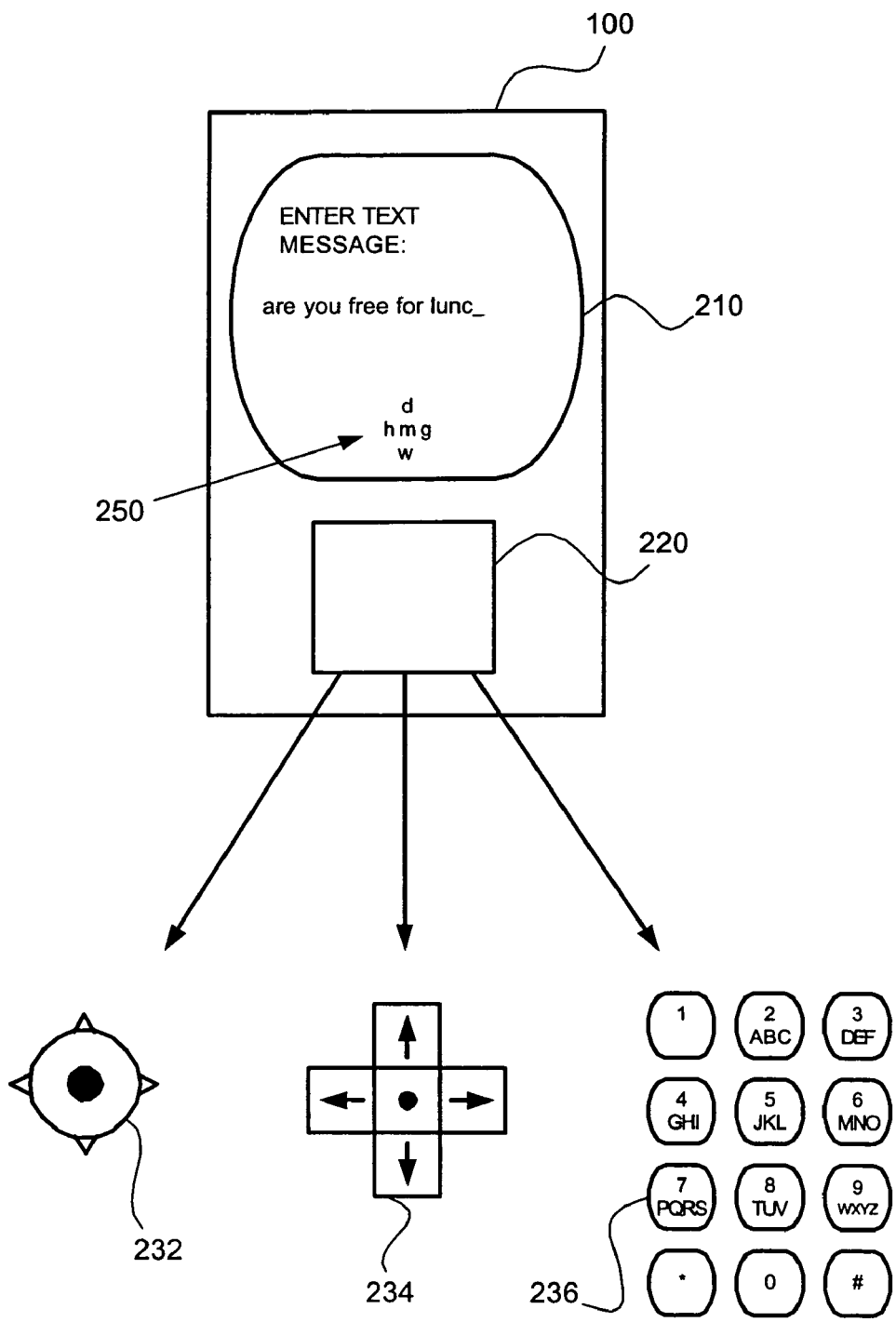
FIG. 2 illustrates computing device of FIG. 1 in one exemplary configuration.

FIG. 2 illustrates computing device 100 of FIG. 1 in one exemplary configuration. In the figure, computing device 100 is shown with a display 210 and directional pad 220. Three exemplary directional pads (joystick 232, five-switch directional pad 234, and number keypad 236) are shown for illustrative purposes. Computer device 100 may include other directional pads, such as a rocker pad, a 9-switch directional pad, and the like.

A directional pad is an input mechanism that enables a user to efficiently select different directional inputs without undue finger movements. For example, the user can use his thumb to push joystick 232 to the left to select a left input. Using the five-switch directional pad 234, the user can roll his thumb to the left so that a left input is selected. Both joystick 232 and five-switch directional pad 234 enable the user to make a selection for a directional input with only minimal finger movements. Number keypad 236 may also be used to enter a directional input. For example, the number key 2, 6, 8, 4, and 5 can be configured to serve as input buttons for up, right, down, left, and center, respectively. Because only five keys in close proximity are used, the number keypad 236 also enables the user to make a selection of a directional input with only small finger movements.

Display 210 is configured to present information for a user to interact with applications executing on computing device 100. For example, display 210 may present the characters that are inputted by the user using the directional pad 220. In the figure, a messaging application is executing on computing device 100. Display 210 shows that a user is composing a message for processing by the messaging application. The message is displayed to the user as the user is creating the message by entering each character that makes up the message.

Display 210 may also present an input guide 250, which is a visual representation of a mapping that associates a directional input with a particular character. The user may use input guide 250 to determine which particular directional input is associated with a character that the user would like to input. For example, input guide 250 shows that the "h" character is associated with a "left" directional input.

Figure 3:
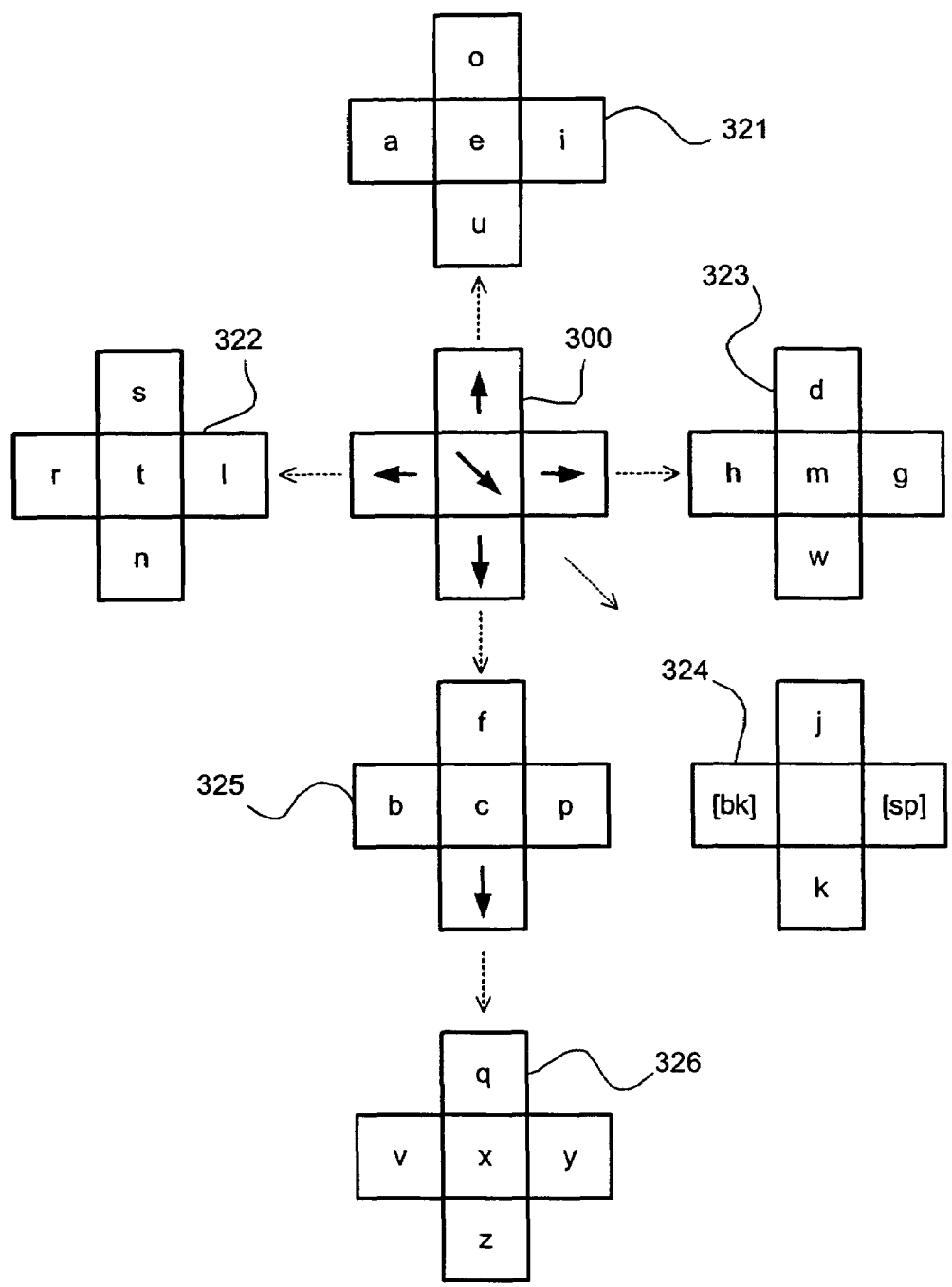
FIG. 3 shows exemplary mappings for associating characters with directional inputs of a directional pad.

FIG. 3 shows exemplary mappings for associating characters with directional inputs of a directional pad. For illustrative purposes, each of the mappings is shown with five characters that are positioned to show their association with different directional inputs of the directional pad. For example, mapping 321 associates the characters "a", "e", "i", "o", and "u" with directional inputs "left", "center", "right", "up" and "down", respectively. It is to be understood that instead of one character, a group of two or more characters may be associated with a particular directional input in a mapping. Thus, multiple characters may be input with a single directional input. Also, a mapping may include more than five directional inputs, depending on the particular directional pad being used.

The mappings shown in FIG. 3 are exemplary configurations used by a character input engine to enable a user to input characters. In this exemplary configuration, each of the mappings 321-326 may be activated from a base state 300. Base state 300 enables a user to choose a particular mapping by selecting a directional input associated with the mapping. Base state 300 may be activated when character input is required. Base state 300 may also be activated after a user has finished inputting a character so that the user may input another character. In another configuration, a base state may be configured such that one or more directional inputs are associated with a character or a group of characters, similar to a mapping.

To input a character, the user first selects a directional input associated with the mapping that includes the character. For example, if the user wanted to input an "a", the user may choose mapping 321 from base state 300 by selecting the "up" directional input. To select a particular character from a mapping, the user may select the directional input associated with that character. For example, from mapping 321, the user may input the "a" character by selecting the "left" directional input.

Each mapping may be ranked based on usage frequency of the characters included in the mapping. For example, vowels, which are perhaps the most frequently used characters, may be included in the same mapping and be assigned a high priority. Directional inputs may also be ranked based on the ease of which the user can select them. For example, the "up" directional may be the easiest to select, followed by "left", "down", "right" and "center".

Mappings 321-326 and the directional inputs may be associated in a manner that facilitates efficiency. One way of enhancing efficiency is to associate a mapping with a directional input based their priorities. For example, the highest-ranking mapping (e.g. mapping 321) may be associated with the highest ranking directional input (e.g. "up"). Characters included in a particular mapping may be associated with directional inputs to enhance efficiency in a similar manner.

For further illustration, the mappings in FIG. 3 show one exemplary configuration for associating mappings with directional inputs in the base state 300. The directional inputs in this configuration, ranking from high to low, are "up", "left", "right", "down" and "center". The "up" directional input is associated with vowels; the "left" directional input is associated with common consonants (i.e. most frequently used consonants); the "right" directional input is associated with semi-common consonants (i.e. a set of consonants with usage frequency that are just less than the usage frequency of the common consonants); the "down" directional input is associated with less common consonants (i.e. a set of consonants with usage frequency that are just less than the usage frequency of the semi-common consonants); and the "center" directional input is associated with the least used characters.

The mappings 321-326 may be configured for terminal selection such that each selection of a directional input results in the input of a character. The mappings 321-326 may also be configured to input a character after a wait period, an activation button is pressed, or other activating conditions. The mappings 321-326 may be further configured such that a user may choose another character group by selecting the associated directional input. For example, from group 325, the user may choose character group 326 by selecting the "down" directional input.

Characters in a mapping may include any character that is useful to the user in inputting text. As shown in the figures, the characters include the letters of the alphabet, punctuation marks, and formatting characters such as space, backspace, and the like. The characters may also include numbers, foreign language words and characters, symbols, accents, etc.

To illustrate the ease of which characters may be entered using the present invention, the word "hello" may be entered with only ten directional inputs using mappings 321-326. The order of the directional inputs are "right, left, up, center, left, right, left, right, up, and up". Depending on the mappings, the word may be entered with more or fewer directional inputs.

Figure 4:
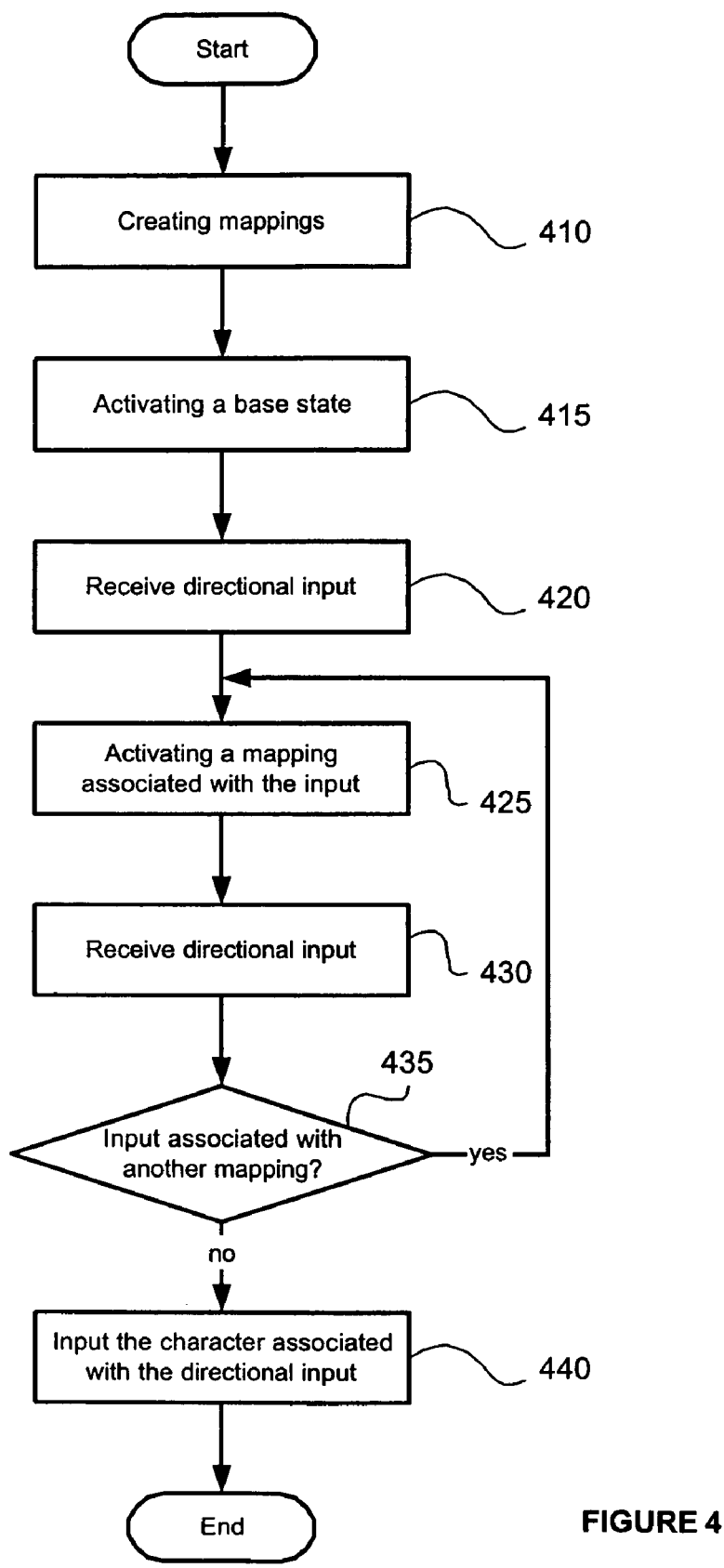
FIG. 4 is an operational flow diagram that shows an exemplary process that enables a user to input characters using a directional pad.

FIG. 4 is an operational flow diagram that shows an exemplary process 400 that enables a user to input characters using a directional pad. Process 400 may be used by a character input engine for interacting with the user for input characters. The user may select directional inputs using the directional pad.

Moving from a start block, the process goes to block 410 where mappings that associate characters with directional inputs are created. The mappings may be ranked based on the frequency of occurrence of their constituent characters. The process continues at block 415.

At block 415, a base state is activated. The base state enables the user to choose a particular mapping by selecting a directional input associated with the mapping. The mappings may be associated with directional inputs based on the ranking of the mappings and the ranking of the directional inputs. In another configuration, the base state may enable the user to choose a character by selecting a directional input associated with the character. (Not shown) Process 400 goes to block 420.

At block 420, a directional input is received from the user. The user may select a directional input using the directional pad. The process continues at block 425 where a mapping associated with the selected directional input is activated. The user may choose a directional input associated with a character (or a group of two or more characters) of the mapping to input that character. The user may also select a directional input associated with another mapping.

At block 430, a directional input is received from the user. The process continues at decision block 435 where a determination is made whether the user selected a directional input associated with another mapping. If so, process 400 returns to block 425 where a mapping associated with the selected directional input is activated.

Returning to block 435, if the user selected a directional input that is not associated with another mapping, then the user has selected a directional input associated with a character. The process continues at block 440 where the character associated with the directional input is inputted.

The above specification, examples and data provide a complete description of the invention. Since many embodiments of the invention can be made without departing from the spirit and scope of the invention, the invention resides in the claims hereinafter appended.

What is claimed is:

1. A computer-implemented method for selecting characters with a directional pad configured to generate directional inputs, the method comprising:
 providing ranked character mappings, wherein the ranked character mappings include: a second highest ranked character mapping including common consonants, a third highest ranked character mapping including semi-common consonants, a fourth highest ranked character mapping including less common consonants, and a lowest ranked character mapping including least common consonants;
 providing ranked directional inputs for a base state;
 providing a base state for activating the ranked character mappings, wherein an input associated with a ranked character mapping activates the ranked character mapping;
 providing a mapping state when the ranked character mapping is activated;
 providing ranked characters of the ranked character mappings when the mapping state is activated;

providing ranked directional inputs for the mapping state, wherein an easiest directional input is associated with the highest ranked character; and reactivating the base state upon selection of a character in the mapping state.

2. The computer-implemented method of claim 1, wherein at least one of the ranked directional inputs for the mapping state is associated with a group of characters.

3. The computer-implemented method of claim 1, wherein a highest ranked character mapping includes vowels.

4. The computer-implemented method of claim 1, further comprising displaying a visual representation of the mapping state when the mapping state is activated.

5. A computer-readable storage medium having computer executable instructions for selecting characters with a directional pad of a mobile device, the instructions comprising:

providing ranked character sets, wherein the ranked character sets include: a second highest ranked character set including common consonants, a third highest ranked character set including semi-common consonants, a fourth highest ranked character set including less common consonants, and a lowest ranked character set including least common consonants;

providing ranked inputs for a base state;

displaying a base state for activating the ranked character sets, wherein an input associated with a ranked character set activates the ranked character set;

displaying a mapping state when the ranked character set is activated;

displaying ranked characters of the ranked character set when the mapping state is activated;

providing ranked directional inputs for the mapping state, wherein an easiest input is associated with the highest ranked character; and redisplaying the base state upon selection of a character in the mapping state.

6. The computer-readable storage medium of claim 5, wherein at least one of the ranked inputs for the mapping state is associated with a group of characters.

7. The computer-readable storage medium of claim 5, wherein a highest ranked character set includes vowels.

8. A computing device, comprising:

an input pad configured to generate directional inputs;

a character input engine for inputting characters using the directional pad, wherein the character input engine is configured to:

provided ranked character mappings, wherein the ranked character mappings include: a second highest ranked character mapping including common consonants, a third highest ranked character mapping including semi-common consonants, a fourth highest ranked character mapping including less common consonants, and a lowest ranked character mapping including least common consonants;

provided ranked directional inputs for a base state;

provided a base state for activating the ranked character mappings, wherein an input associated with a ranked character mapping activates the ranked character mapping;

provided a mapping state when the ranked character mapping is activated;

provided ranked characters of the ranked character mappings when the mapping state is activated;

provided ranked directional inputs for the mapping state, wherein an easiest directional input is associated with the highest ranked character; and reactivate the base state upon selection of a character in the mapping state.

* * * * *